US010288452B2

(12) United States Patent
Santos (10) Patent No.: US 10,288,452 B2
(45) Date of Patent: May 14, 2019

(54) PROGRAMMABLE SENSOR (71) Applicant: The Timken Company, North Canton, OH (US)

(72) Inventor: John Santos, Keene, NH (US)

(73) Assignee: The Timken Company, North Canton, OH (US)

(*) Notice: Subject to any disclaimer, the term of this patent is extended or adjusted under 35 U.S.C. 154(b) by 0 days.

(21) Appl. No.: 15/525,230

(22) PCT Filed: Dec. 28, 2015

(86) PCT No.: PCT/US2015/067602
§ 371 (c)(1),
(2) Date: May 8, 2017

(87) PCT Pub. No.: WO2016/109392
PCT Pub. Date: Jul. 7, 2016

(65) Prior Publication Data
US 2017/0363447 A1 Dec. 21, 2017

Related U.S. Application Data (60) Provisional application No. 62/097,314, filed on Dec. 29, 2014.

(51) Int. Cl.
*G01D 5/244* (2006.01)
*G01D 18/00* (2006.01)

(52) U.S. Cl.
CPC ......... *G01D 5/2448* (2013.01); *G01D 5/2449* (2013.01); *G01D 5/24452* (2013.01); *G01D 18/008* (2013.01)

(58) Field of Classification Search
CPC ............. G01D 5/2448; G01D 5/24452; G01D 18/008; G01D 5/2449
(Continued)

(56) References Cited

U.S. PATENT DOCUMENTS 6,714,003 B2   3/2004  Babin
6,812,694 B2  11/2004  Uenoyama
(Continued)

FOREIGN PATENT DOCUMENTS

CN   101115968 A   1/2008
CN   101213424 A   7/2008
(Continued)

OTHER PUBLICATIONS

Timken, Timken Magnetic Encoders, 2013.*
(Continued)

*Primary Examiner* — Michael P Nghiem
*Assistant Examiner* — Dacthang P Ngo
(74) *Attorney, Agent, or Firm* — Michael Best & Friedrich LLP (57) ABSTRACT A sensor for an encoder. The sensor includes a sensing circuit, an active setting module, an inactive setting module, and a sensor interface. The sensing circuit module is configured to generate an output signal related to a sensed characteristic. The active setting module includes a first pole width setting. The first pole width setting is associated with a first pole width for the encoder. The first pole width setting is accessible by the sensing circuit module. The inactive setting module includes second pole width setting. The second pole width setting is associated with a second pole width for the encoder. The second pole width setting is not accessible by the sensing circuit module. The sensor interface is configured for retrieving the second pole width setting from the inactive setting module and writing the second pole width setting to the active setting module.

20 Claims, 5 Drawing Sheets (58) Field of Classification Search
USPC .......................................................... 702/94
See application file for complete search history.

(56) References Cited

U.S. PATENT DOCUMENTS

| | | | |
|---|---|---|---|
| 7,432,497 | B2 | 10/2008 | Sakagami et al. |
| 7,609,138 | B2 | 10/2009 | Dietrich et al. |
| 7,667,455 | B2 | 2/2010 | Sugiyama et al. |
| 7,725,273 | B2 | 5/2010 | Jannotta |
| 8,729,890 | B2 | 5/2014 | Donovan et al. |
| 2004/0036017 | A1 | 2/2004 | Ito |
| 2005/0072911 | A1 | 4/2005 | Kuroda et al. |
| 2008/0061771 | A1* | 3/2008 | Sugiyama ............ G01D 5/2451 324/207.25 |
| 2009/0102461 | A1 | 4/2009 | Santos et al. |
| 2010/0176801 | A1 | 7/2010 | Aruga et al. |
| 2011/0167919 | A1 | 7/2011 | Plöchinger et al. |
| 2011/0175601 | A1 | 7/2011 | Bogos et al. |
| 2012/0025066 | A1 | 2/2012 | Gordon-Ingram et al. |
| 2013/0293223 | A1 | 11/2013 | Youngner et al. |
| 2013/0304422 | A1 | 11/2013 | Ausserlechner et al. |

FOREIGN PATENT DOCUMENTS

| | | |
|---|---|---|
| CN | 201885729 | 6/2011 |
| DE | 10118072 | 11/2001 |
| DE | 202007016235 | 4/2009 |
| EP | 2559971 | 2/2013 |
| JP | H05-318869 A | 12/1993 |
| JP | 2003-227735 A | 8/2003 |
| JP | 2005-128002 A | 5/2005 |
| JP | 2009-204315 A | 9/2009 |
| JP | 2011-501156 A | 1/2011 |
| JP | 2012-523558 A | 10/2012 |
| JP | 2014-202724 A | 10/2014 |
| KR | 10-20070032356 A | 3/2007 |
| KR | 20130057335 | 5/2013 |
| WO | 2009/078048 | 6/2009 |

OTHER PUBLICATIONS

International Search Report and Written Opinion for Application No. PCT/US2015/067602 dated Apr. 21, 2016 (13 pages).
Avago Technologies, "16-bit Programmable Magnetic Encoder", <http://www.avagotech.com/pages/en/motion_control_encoder_products/magnetic_encoders/aeat-6600-t16/> webpage accessed Jun. 11, 2014.
austriamicrosystems AG, "12 Bit Programmable Magnetic Rotary Encoder", <www.austriamicrosystems.com> webpage accessed Jun. 11, 2014.
Japanese Patent Office Action for Application No. 2017-534962 dated Aug. 3, 2018 (12 pages, English translation included).
Korean Patent Office Action for Application No. 10-2017-7015763 dated Jul. 19, 2018 (17 pages, English translation included).
Chinese Patent Office Action for Application No. 201580067571.X dated Nov. 2, 2018 (15 pages, English translation included).

* cited by examiner

PROGRAMMABLE SENSOR

RELATED APPLICATIONS

This application claims the benefit of U.S. Provisional Patent Application No. 62/097,314, filed Dec. 29, 2014, the entire content of which is hereby incorporated by reference.

BACKGROUND

This invention relates to programmable sensor.

SUMMARY

Encoder technology (e.g., magnetic encoder technology) offers reliable high-resolution performance for motion control applications such as motor controls, vector controls, resolver replacements, electric power steering, wind energy, stage lighting, robotics, web processing, printing, etc. In particular, magnetic encoders are desirable for environments that experience high-temperature, shocks, and vibrations. Encoders can include, for example, a moving member and an array of one or more sensors that can be used to detect a position or speed of the moving member. Based on output signals from the sensors, the precise position or speed information for the encoder can be determined.

However, an array of sensors that produces accurate position or speed data for one moving member may not produce accurate position or speed data for a different moving member. There are a variety of reasons why the sensors may produce accurate and reliable data for one moving member and unreliable and inaccurate data for another. For example, each rotating member is coded with a periodic pattern, and one or more sensing elements (e.g., Hall Effect sensing elements) in a sensor array are used over the length of the pattern to generate output signals related to position and/or speed. With specific reference to a rotary incremental encoder (e.g., a rotary encoder that includes a rotating member for speed and position detection), one rotating member may be larger than another rotating member, and the one rotating member may have a different resolution or pole width (e.g., a distance between poles of the same polarity) than the other rotating member.

A sensor or sensor chip that is designed to detect the position or speed of the rotating member is trimmed during configuration using, for example, external measurement equipment to optimize offset values in the sensor chip for detecting a specific pole width. Offset values or pole width data associated with the trimming are saved in the chip in one time or reprogrammable nonvolatile memory. Such an action to "zero" offsets requires access to a number of sensor chip signals and is completed before the sensor is put into service.

The invention described herein relates to a programmable sensor or sensor chip (e.g., a magnetic position sensor for a linear or rotary encoder) and a process for programming or reprogramming the sensor or sensor chip. The sensor utilizes normally unused or inactive programmable memory in an integrated circuit (e.g., an application specific integrated circuit ["ASIC"]) to store configuration information. The configuration information can be retrieved to allow the sensor to be rapidly configured or reprogrammed to work with a number of different magnetic targets having different resolutions or pole widths. Configuring or reprogramming the sensor can be achieved without the use of specialized hardware or software.

In one embodiment, the invention provides a sensor for an encoder. The sensor includes a sensing circuit, an active setting module, an inactive setting module, and a sensor interface. The sensing circuit module is operable to generate an output signal related to a sensed characteristic. The active setting module includes a first pole width setting stored in a first physical memory location. The first pole width setting is associated with a first pole width for the encoder. The first pole width setting is accessible from the first physical memory location by the sensing circuit module. The inactive setting module includes a second pole width setting stored in a second physical memory location. The second pole width setting is associated with a second pole width for the encoder. The second pole width setting is not accessible from the second physical memory location by the sensing circuit module. The sensor interface is operable to retrieve the second pole width setting from the second physical memory location in the inactive setting module and write the second pole width setting to the first physical memory location in the active setting module.

In another embodiment, the invention provides a method of programming a sensor for an encoder. The method includes storing a first pole width setting in a first physical memory location of an active setting module. The first pole width setting is associated with a first pole width for the encoder, and the first pole width setting is accessible from the first physical memory location by a sensing circuit module. The method also includes storing a second pole width setting in a second physical memory location of an inactive setting module. The second pole width setting is associated with a second pole width for the encoder, and the second pole width setting is not accessible from the second physical memory location by the sensing circuit module. The method also includes retrieving, by the sensing circuit module, the first pole width setting from the first physical memory location of the active setting module, retrieving the second pole width setting from the second physical memory location of the inactive setting module, writing the second pole width setting to the first physical memory location of the active setting module, and retrieving, by the sensing circuit module, the second pole width setting from the first physical memory location of the active setting module.

In another embodiment, the invention provides a sensor for an encoder. The sensor includes a sensing circuit, an active data module, an inactive data module, and a sensor interface. The sensing circuit module is configured to generate an output signal related to a sensed characteristic. The active data module includes first pole width data. The first pole width data is associated with a first pole width for the encoder. The first pole width data is accessible by the sensing circuit module. The inactive data module includes second pole width data. The second pole width data is associated with a second pole width for the encoder. The second pole width data is not accessible by the sensing circuit module. The sensor interface used by the end user is configured for retrieving the second pole width data from the inactive data module and writing the second pole width data to the active data module.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by digital logic, a state machine, a single processor, or multiple processors arranged in any form, including parallel processors, serial processors, tandem processors or cloud processing/cloud computing configurations.

DETAILED DESCRIPTION

The invention described herein relates to a sensor that can be programmed or reprogrammed in order to accurately detect the position and speed of a variety of encoders or encoding members (e.g., a rotary encoding member). For example, a rotary incremental encoder includes a rotating member and a sensor array (e.g., including one or more sensors) for determining a position and speed of the rotating member. The rotating member includes a pattern having a pattern length that includes, for example, alternating North and South magnetic poles. The magnetic poles have a pole width (e.g., a 1-5 mm pole width) that corresponds to the width of an individual pole or the width between poles having the same polarity, and only one pole width setting or trim setting can be active for the sensor. However, the sensor is also trimmed for a number of different configurations or pole widths during manufacturing. The data or settings needed to optimize the sensor for these additional configurations or pole widths are saved in an inactive memory location of the sensor. The inactive memory is not and/or cannot be accessed by the sensor during normal operation. A user can then recall the stored settings and use them to reconfigure or reprogram the sensor without requiring specialized measurement or programming equipment. The stored settings are retrieved from the inactive memory location and written to an active memory location within the sensor such that the sensor is then configured for a new or different pole width setting (i.e., the active and inactive memory locations correspond to physical memory locations within the sensor).

Figure 1:
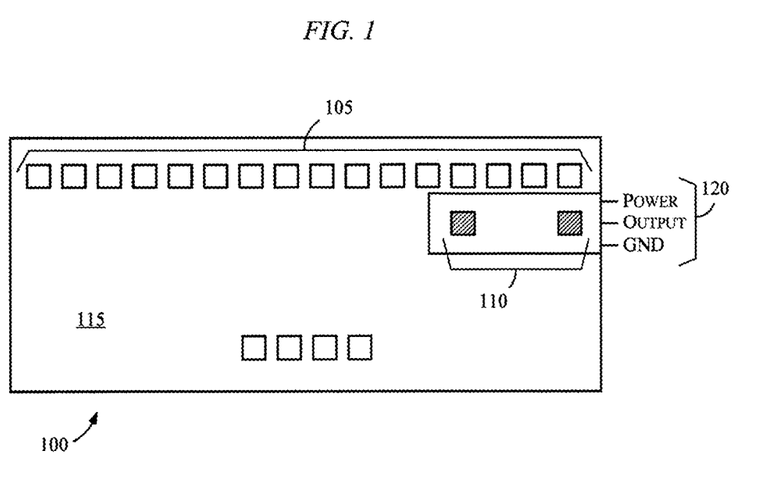
FIG. 1 illustrates a portion of a sensor system.

Although the invention is described primarily with respect to a rotary incremental encoder using magnetic poles and Hall Effect sensors, the invention can also be applied to various types of sensors, absolute encoders, linear encoders, and encoders using sensors other than Hall Effect sensors. Specifically, FIG. 1 illustrates a portion of a sensor system 100 that includes a sensor array 105. In some constructions, the sensor elements of the sensor system 100 are contained on a single integrated circuit 115. The sensors in the sensor array generate analog or digital output signals.

Figure 2A:
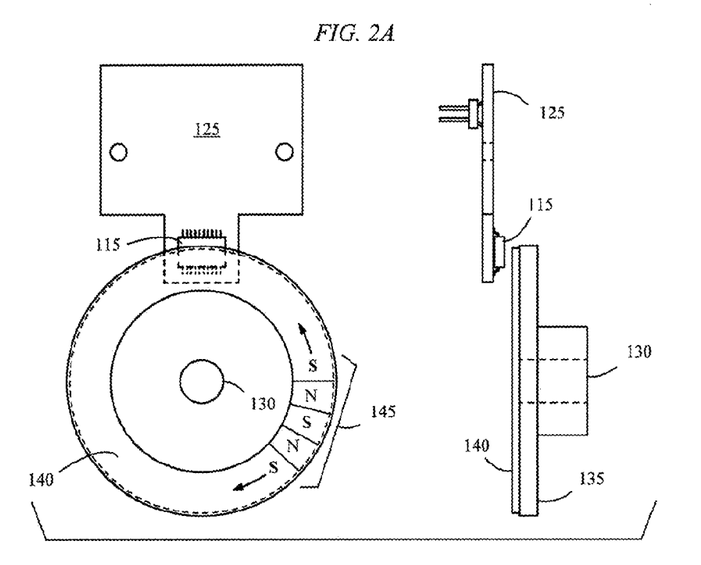
FIG. 2A illustrates a sensor system that includes a sensor array located adjacent to a rotatable member that includes alternating magnetic poles.
Figure 2B:
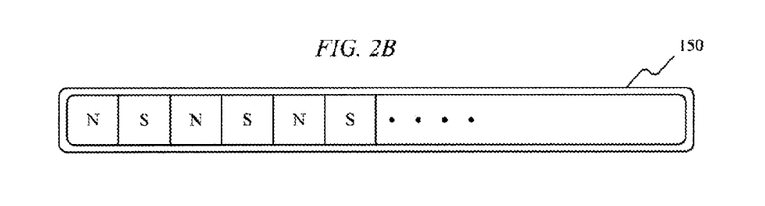
FIG. 2B illustrates a linearly movable member that includes alternating magnetic poles and can be used in the sensor system of FIG. 2A.

The portion of the sensor system 100 of FIG. 1 can be used with a movable member such as a rotatable member 130 (e.g. a wheel or shaft of a rotary encoder), as shown in FIG. 2A. The portion of the sensor system 100 of FIG. 1 is illustrated in FIG. 2A as an integrated circuit 115 mounted on a circuit board 125. The high resolution sensor array 105 is disposed adjacent to a circular plate 135 having a magnetic region 140 at the outer edge with a plurality of alternating magnetic poles 145 embedded therein. The circular plate 135 may be attached to the rotatable member 130 or may be an integral part of the rotatable member 130. The sensor system 100 can also be implemented or used with a linear encoder such as the linear encoder 150 illustrated in FIG. 2B.

Figure 3:
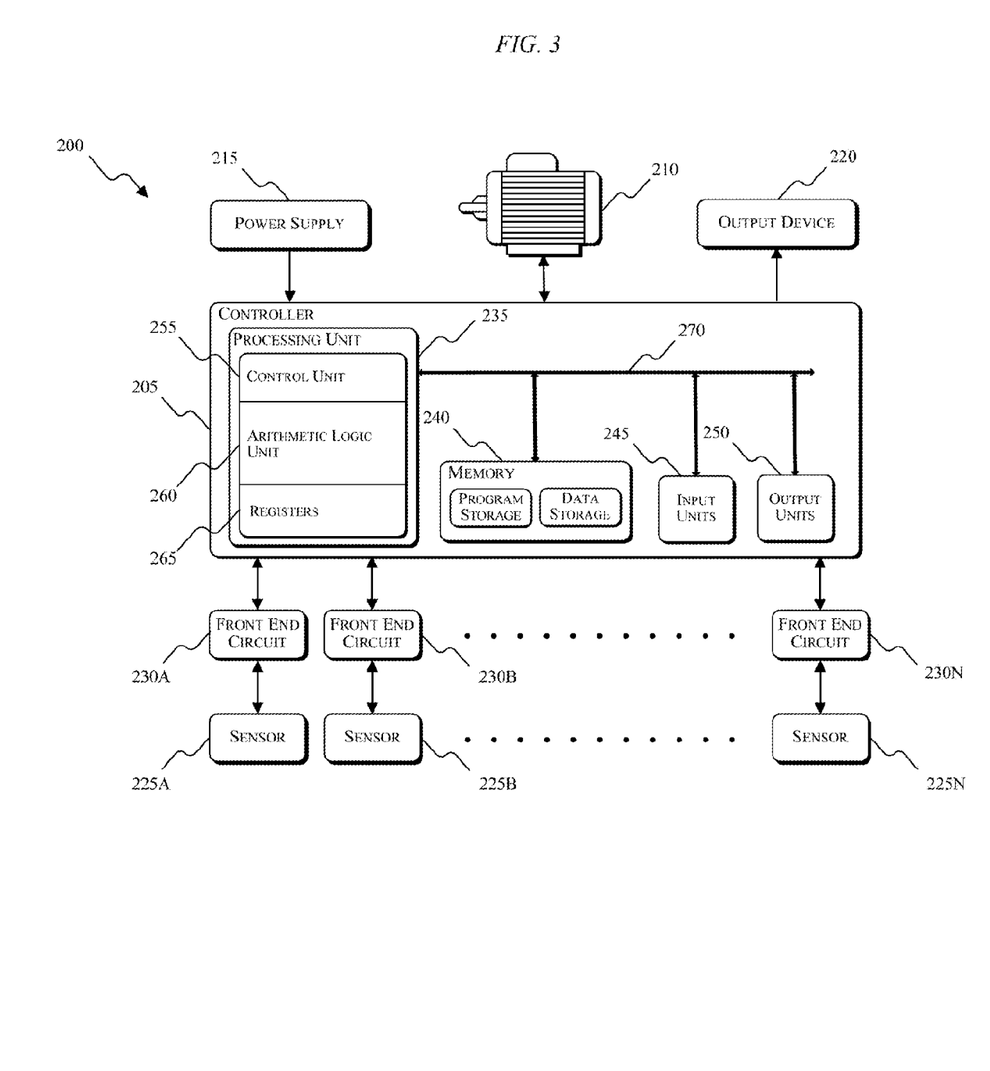
FIG. 3 is a block diagram of a sensor system according to an embodiment of the invention.

FIG. 3 illustrates a sensor system 200 including a controller 205. The controller 205 is electrically and/or communicatively connected to a variety of modules or components of the system 200. For example, the illustrated controller 205 is connected to one or more actuation devices (e.g., motors) and drives 210, a power supply module 215, an output device 220, and a plurality of sensors 225A-225N (through corresponding front end circuitry 230A-230N), where N indicates some finite number of sensors included in the system 200. The controller 205 includes combinations of hardware and software that are operable to, among other things, monitor and/or control the operation of the system 200, control the movement of the actuation device 210, monitor the outputs of the Hall Effect sensors 225, etc.

In some embodiments, the controller 205 includes a plurality of electrical and electronic components that provide power, monitoring, and control to the system 200. For example, the controller 205 includes, among other things, a processing unit 235 (e.g., a microprocessor, a microcontroller, or another suitable programmable device), a physical memory 240, input units 245, and output units 250. The processing unit 235 includes, among other things, a control unit 255, an arithmetic logic unit ("ALU") 260, and a plurality of registers 265 (shown as a group of registers in FIG. 3), and is implemented using a known computer architecture, such as a modified Harvard architecture, a von Neumann architecture, etc. The processing unit 235, the memory 240, the input units 245, and the output units 250, as well as the various modules connected to the controller 205 are connected by one or more control and/or data buses (e.g., common bus 270). The control and/or data buses are shown generally in FIG. 3 for illustrative purposes. The use of one or more control and/or data buses for the interconnection between and communication among the various modules and components would be known to a person skilled in the art in view of the invention described herein. In some embodiments, the system 200 is implemented partially or entirely on a semiconductor chip (e.g., an application specific integrated circuit ["ASIC"], a field-programmable gate array ["FPGA"] semiconductor, etc.).

The physical memory 240 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 235 is connected to the memory 240 and executes software instructions that are capable of being stored in a RAM of the memory 240 (e.g., during execution), a ROM of the memory 240 (e.g., on a generally permanent basis), or another non-transitory computer readable medium such as another memory or a disc. Software included in the implementation of the system 200 can be stored in the memory 240 of the controller 205. The software includes, for example, firmware, one or more applications, program data, filters, rules, one or more program modules, and other executable instructions. The controller 205 is configured to retrieve from memory and execute, among other things, instructions related to the control processes and methods described herein. In other constructions, the controller 205 includes additional, fewer, or different components.

The power supply module 215 supplies a nominal AC or DC voltage to the controller 205 or other components or modules of the system 200. The power supply module 215 is powered by, for example, a power source having nominal line voltages between 100V and 240V AC and frequencies of approximately 50-60Hz. The power supply module 215 is also configured to supply lower voltages to operate circuits and components within the controller 205. In other constructions, the controller 205 or other components and modules within the system 200 are powered by one or more batteries or battery packs, or another grid-independent power source (e.g., a generator, a solar panel, etc.).

Figure 4:
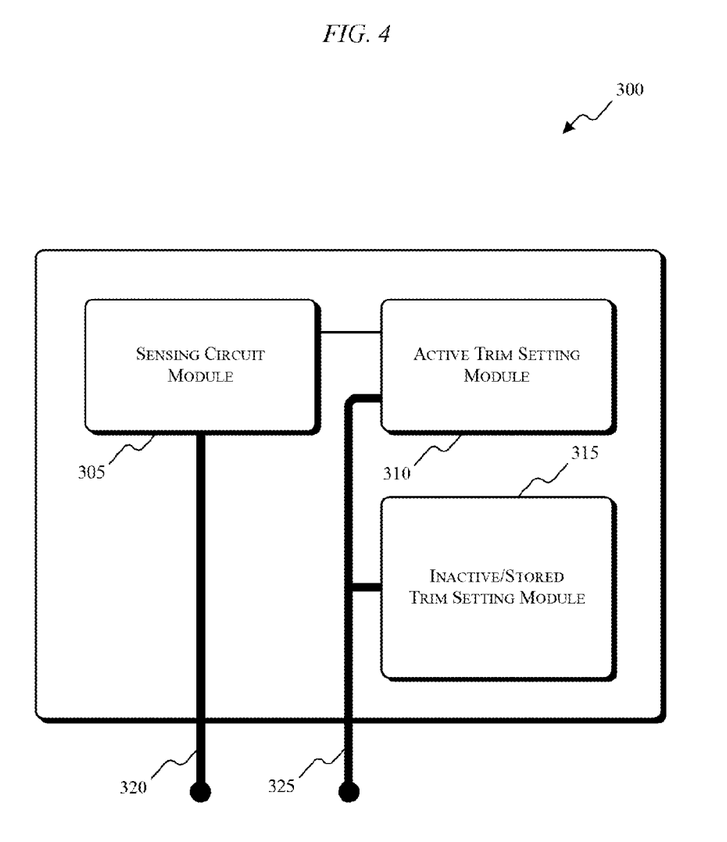
FIG. 4 is a block diagram of a programmable sensor according to an embodiment of the invention.

FIG. 4 illustrates a simplified block diagram of a sensor or sensor integrated circuit ("IC") 300 that includes a sensing circuit module 305. The sensing circuit module 305 can include a processor or processing unit. In some embodiments, the sensor 300 includes circuitry and functionality similar to the system 200 described above with respect to FIG. 3 (e.g., a processing unit, physical memory, a plurality of sensors, etc.). The sensing circuit module 305 uses trim settings or pole width settings (e.g., pole width offset settings) to "zero" the sensing circuit's resolution or pole width offsets. The sensor 300 also includes an active trim setting module 310, an inactive/stored trim setting module 315, a first interface 320, and a second interface 325. Each of the active trim setting module 310 and the inactive/stored trim setting module 315 include memory, such as the memory 240 described above. In some embodiments, the first interface 320 allows for external connection to a device that is configured to receive measurements and sensing data. The first interface 320 can include, for example, four wires for communicating with the device. The second interface 325 provides an external interface for programming or reprogramming the trim setting that is in the active trim setting module 310. In some embodiments, the second interface 325 includes two wires to provide a two-wire interface ("TWI"). In other embodiments, the second interface 325 can include three wires.

The value for the trim setting in the active trim setting module 310 is the trim setting that is used by the sensing circuit module 305, and should correspond to a resolution or pole width of an encoding member that is being used. The sensor 300 can be programmed or reprogrammed to use a different active value for the trim setting in the active trim setting module 310. For example, trim setting can be retrieved from a second physical memory location in the inactive/stored trim setting module 315, and written into a first physical memory location in the active trim setting module 310 using the interface 325. In some embodiments, the triggering of this reprogramming function is controlled or limited to avoid unintentionally changing the value of the trim setting in the active trim setting module 310. In order to prevent unwanted reprogramming of the active trim setting, programming or reprogramming of the active trim setting can be achieved using a TWI in addition to an external enable pin. In some embodiments, a TWI is included with a sensor cable for the sensor 300. The enable function can be triggered, for example, by a reed switch or Hall Effect switch on a sensor PCB or by back driving a sensor output pin to a specific detectable threshold voltage. After the reprogramming of the sensor 300 has been enabled, a TWI protocol, such as $I^2C$ ("I-squared-C"), can be used to reprogram the sensor 300.

Figure 5:
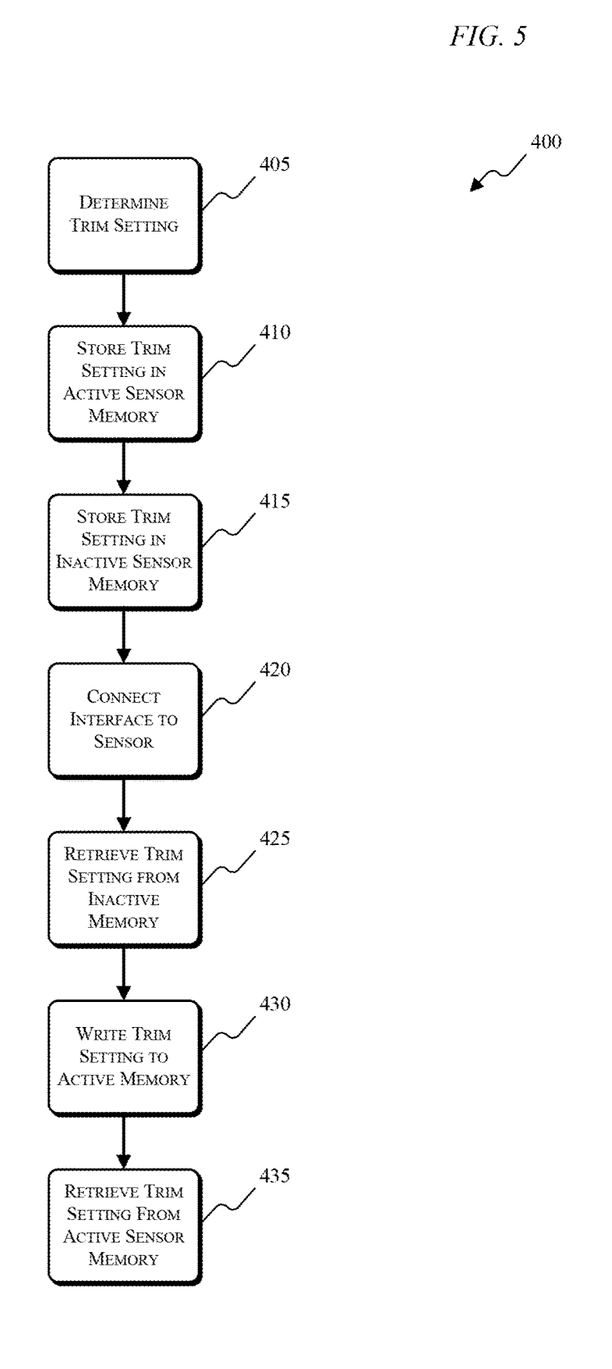
FIG. 5 is a process for operating and configuring or reprogramming a sensor according to an embodiment of the invention.

A process 400 for using and programming or reprogramming the sensor 300 is shown in FIG. 5. The process 400 begins with determining trim setting or pole width setting values related to one or a plurality of encoders (step 405). The trim setting can optionally be stored in an active memory location of the sensor 300 (e.g., the active trim setting module 310) (step 410). Additionally, trim setting or pole width setting are also stored in an inactive memory location of the sensor 300 (e.g., the inactive/stored trim setting module 315) (step 415). The trim setting or pole width setting that are stored in the active memory location of the sensor 300 are retrieved and used by, for example, the sensing circuit module 305 when sensing or detecting a characteristic (e.g. during speed and/or position detection). The trim settings or pole width settings that are stored in the inactive memory locations of the sensor 300 are not accessible and/or are not used by the sensing circuit module 305. When a programming or reprogramming operation has been initiated, an interface is connected to the sensor 300 (step 420). Trim setting or pole width setting are then retrieved from the inactive memory location of the sensor 300 (step 425). The trim setting or pole width setting that is retrieved from the inactive memory locations is written to the active memory location of the sensor (step 430). By writing the retrieved trim setting or pole width setting to the active memory location, the previous trim setting or pole width setting stored in the active memory location is overwritten or replaced. The new trim setting or pole width setting that are stored in the active memory location of the sensor 300 are then retrieved (step 435) and used by the sensing circuit module 305 when sensing or detecting a characteristic (e.g. during speed and/or position detection).

Thus, the invention provides, among other things, a sensor that can be programmed and reprogrammed for a variety of magnetic targets having different resolutions or pole widths. Various features and advantages of the invention are set forth in the following claims.

What is claimed is:

1. A sensor for an encoder, the sensor comprising:
a sensing circuit module operable to generate an output signal related to a sensed characteristic;
an active setting module including a first pole width setting stored in a first physical memory location, the first pole width setting associated with a first pole width for the encoder, the first pole width setting operable to be used to configure the sensing circuit module to detect the first pole width for the encoder, the first pole width setting accessible from the first physical memory location by the sensing circuit module;
an inactive setting module including a second pole width setting stored in a second physical memory location, the second pole width setting associated with a second pole width for the encoder, the second pole width setting operable to be used to configure the sensing circuit module to detect the second pole width for the encoder, the second pole width setting not accessible from the second physical memory location by the sensing circuit module; and
a sensor interface operable to retrieve the second pole width setting from the second physical memory location in the inactive setting module and write the second pole width setting to the first physical memory location in the active setting module,
wherein the second pole width setting is different than the first pole width setting.

2. The sensor of claim 1, wherein the sensor includes a Hall Effect sensor.

3. The sensor of claim 1, wherein the sensor interface is a two-wire interface ("TWI").

4. The sensor of claim 1, wherein the sensor is included in an application specific integrated circuit ("ASIC").

5. The sensor of claim 1, wherein the inactive setting module includes the first pole width setting and the second pole width setting.

6. The sensor of claim 5, wherein the encoder is a rotary encoder.

7. The sensor of claim 5, wherein the encoder is a linear encoder.

8. A method of programming a sensor for an encoder, the method comprising:
storing a first pole width setting in a first physical memory location of an active setting module, the first pole width setting associated with a first pole width for the encoder, the first pole width setting operable to be used to configure a sensing circuit module to detect the first pole width for the encoder, the first pole width setting accessible from the first physical memory location by the sensing circuit module;
storing a second pole width setting in a second physical memory location of an inactive setting module, the second pole width setting associated with a second pole width for the encoder, the second pole width setting operable to be used to configure the sensing circuit module to detect the second pole width for the encoder, the second pole width setting not accessible from the second physical memory location by the sensing circuit module;
retrieving, by the sensing circuit module, the first pole width setting from the first physical memory location of the active setting module;
retrieving, by a sensor interface, the second pole width setting from the second physical memory location of the inactive setting module;
writing, by the sensor interface, the second pole width setting to the first physical memory location of the active setting module; and
retrieving, by the sensing circuit module, the second pole width setting from the first physical memory location of the active setting module,
wherein the second pole width setting is different than the first pole width setting.

9. The method of claim 8, wherein the sensor includes a Hall Effect sensor.

10. The method of claim 8, wherein the second pole width setting is retrieved from the inactive setting module using a two-wire interface ("TWI").

11. The method of claim 8, wherein the sensor is included in an application specific integrated circuit ("ASIC").

12. The method of claim 8, further comprising storing the first pole width setting in the inactive setting module.

13. The method of claim 12, wherein the encoder is a rotary encoder.

14. The method of claim 12, wherein the encoder is a linear encoder.

15. A sensor for an encoder, the sensor comprising:
a sensing circuit module configured to generate an output signal related to a sensed characteristic;
an active data module including first pole width data, the first pole width data associated with a first pole width for the encoder, the first pole width data operable to be used to configure the sensing circuit module to detect the first pole width for the encoder, the first pole width data accessible by the sensing circuit module;
an inactive data module including second pole width data, the second pole width data associated with a second pole width for the encoder, the second pole width data operable to be used to configure the sensing circuit module to detect the second pole width for the encoder, the second pole width data not accessible by the sensing circuit module; and
a sensor interface configured for retrieving the second pole width data from the inactive data module and writing the second pole width data to the active data module,
wherein the second pole width data is different than the first pole width data.

16. The sensor of claim 15, wherein the sensor includes a Hall Effect sensor.

17. The sensor of claim 15, wherein the sensor interface is a two-wire interface ("TWI").

18. The sensor of claim 15, wherein the sensor is included in an application specific integrated circuit ("ASIC").

19. The sensor of claim 15, wherein the inactive data module includes the first pole width data and the second pole width data.

20. The sensor of claim 19, wherein the encoder is selected from the group consisting of a rotary encoder and a linear encoder.

* * * * *